United States Patent [19]

Stewart

[11] Patent Number: 4,787,575
[45] Date of Patent: Nov. 29, 1988

[54] SIGNAL BALLOON DEVICE

[75] Inventor: Ronald R. Stewart, Sumner, Wash.

[73] Assignee: David L. Huskey, Sumner, Wash.; a part interest

[21] Appl. No.: 18,399

[22] Filed: Feb. 25, 1987

[51] Int. Cl.⁴ ............................................. B64B 1/50
[52] U.S. Cl. .................... 244/33; 244/155 R; 116/210; 40/547; 40/214
[58] Field of Search ......... 244/155 R, 33, 31, 153 R, 244/155 A; 350/96.23; 441/23, 30; 116/210, DIG. 8, DIG. 9; 446/219; 40/547, 212, 214, 215

[56] References Cited

U.S. PATENT DOCUMENTS

| | | | |
|---|---|---|---|
| 827,350 | 7/1906 | Crofford | 441/89 |
| 2,592,444 | 4/1952 | Matelena | 40/214 |
| 2,619,303 | 11/1952 | Martin | 244/33 |
| 2,923,917 | 2/1960 | McPherson | 116/210 |
| 3,002,490 | 10/1961 | Murray | 116/210 |
| 3,279,419 | 11/1966 | Demarco | 116/124 |
| 3,592,157 | 7/1971 | Schwartz | 116/210 |
| 3,727,229 | 4/1973 | Clinger et al. | 116/210 |
| 3,791,611 | 2/1974 | Babbidge | 244/33 |
| 4,084,102 | 4/1978 | Fry et al. | 244/33 |
| 4,048,565 | 9/1977 | Rice, Sr. | 325/114 |
| 4,114,561 | 9/1978 | Asaro | 116/124 |
| 4,123,987 | 11/1978 | Singerle et al. | 116/124 |
| 4,178,867 | 12/1979 | Shyu | 114/39 |
| 4,185,582 | 1/1980 | Bryant | 116/210 |
| 4,219,819 | 8/1980 | Patel | 343/18 B |
| 4,416,433 | 11/1983 | Bellina | 244/33 |
| 4,497,272 | 2/1985 | Veazey | 244/32 |
| 4,533,099 | 8/1985 | Stewart | 244/33 |

Primary Examiner—Galen Barefoot
Assistant Examiner—L. M. Fiorito
Attorney, Agent, or Firm—Joan H. Pauly

[57] ABSTRACT

A signal balloon (2, 2') has an inflated configuration that is horizontally elongated with opposite tapered ends (4, 6, 4', 6'). The balloon (2, 2') is shaped and dimensioned to cause it to ascend in response to an increase in wind speed. The sidewalls of the balloon (2, 2') have light transmitting portions (10, 10') and reflective portions (12, 12'). A light (40, 40') is positioned inside the balloon (2, 2'). The light may be an electric lamp (40) connected to a power source (64) on the ground via an electrically conductive tether (34). The light (40') may also be the upper end of a fiber optic conductor tether (34') which has a lower end connected to a light source (92') on the ground. The balloon (2') is provided with pivotable lower and upper lift members (22', 24') which are connected to the tether (34') and pivot in response to changes in orientation of the tether (34') to increase the lift of the balloon (2') when the tether (34') inclines away from a vertical position.

14 Claims, 4 Drawing Sheets

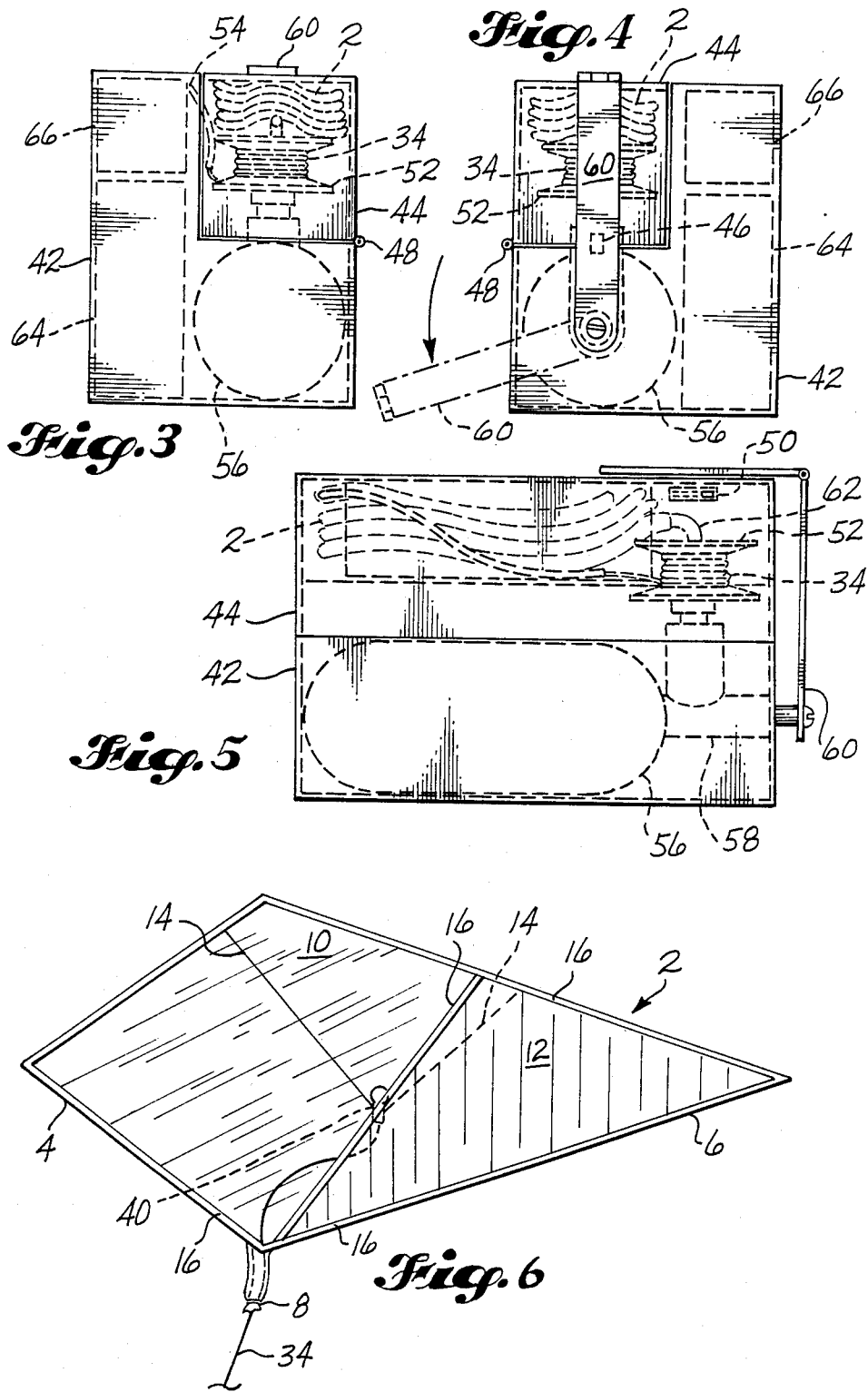

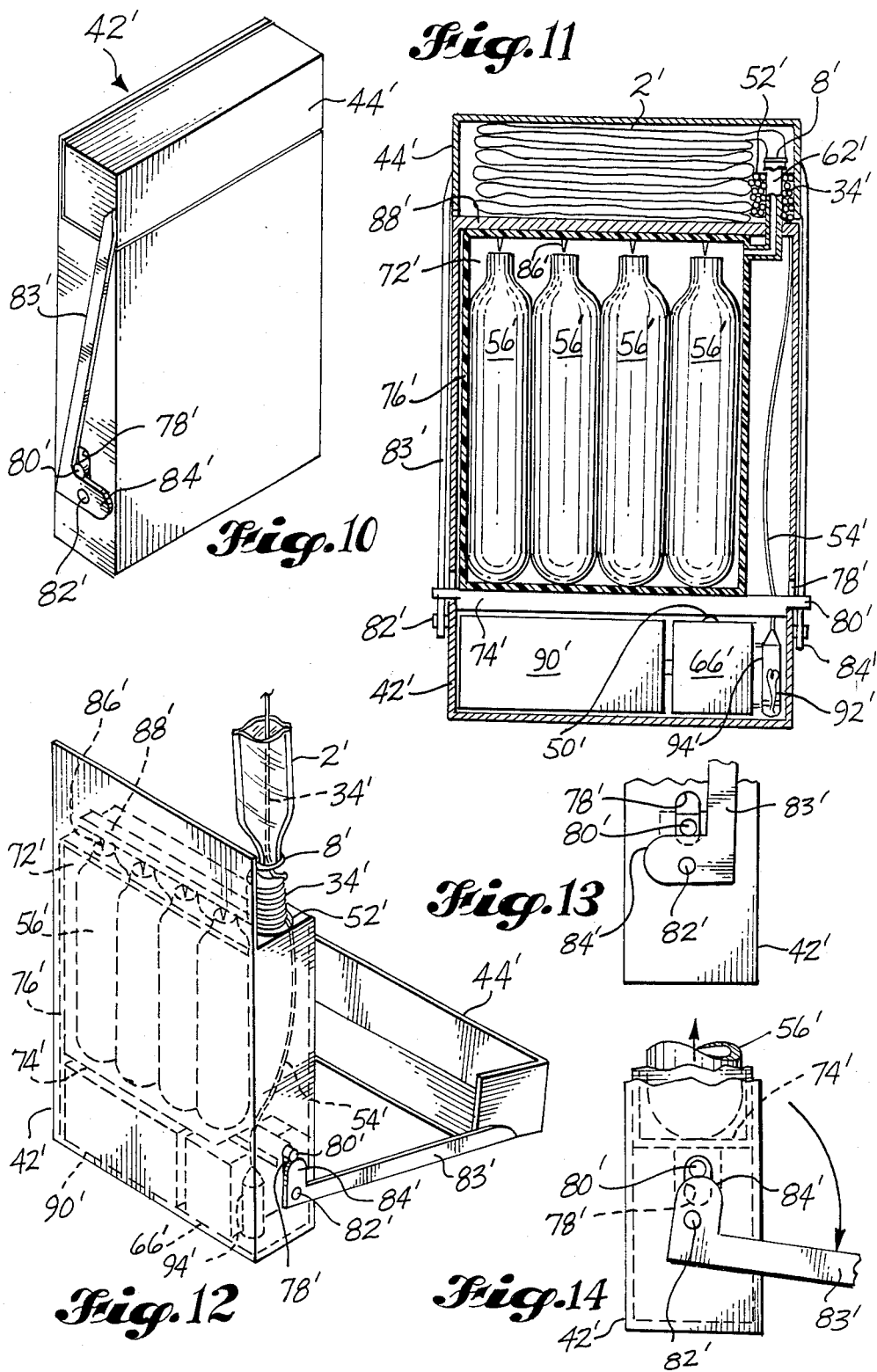

SIGNAL BALLOON DEVICE

TECHNICAL FIELD

This invention relates to location signal devices and, more particularly, to such a device which includes an inflatable balloon having an elongated tapered configuration to cause the balloon to ascend in response to an increase in wind speed, and light means inside the balloon which is powered by an electrically conductive or fiber optic tether.

BACKGROUND ART

The idea of using an inflatable balloon as a device for signaling the location of a person in distress has been known at least since the beginning of the present century. An example of an early proposed device is disclosed in U.S. Pat. No. 827,350, granted July 31, 1906, to A. C. Crofford. In the Crofford device, a signal balloon is attached to a life preserver to signal to passing boats that a person is in the water and is in need of rescue. With the advent of aircraft and their use in search and rescue missions, the interest in location signal balloons increased. Their use in various environments has been proposed, including open water and remote mountainous and/or forested areas.

A number of problems have been encountered in association with known proposals for signal balloons. A major drawback of previously proposed balloons is that their configuration, which is usually substantially spherical, causes them to have a tendency to drift downwind and downward in the wind. The resulting loss in altitude decreases the effectiveness of the balloon by decreasing the distance from which it is visible. The downwind drifting also makes it more difficult to accurately pinpoint the location of the person in distress. In forested areas, the decrease in altitude can even cause a balloon to descend below tree top level and thereby become totally ineffective. Another problem with known signal balloon apparatus is that it is often heavy and unwieldy. In some of the proposed systems, components like transmitters and power sources are carried into the air by the balloon. The added weight of these components makes it necessary to make the balloon larger to provide the required lift. The larger balloon in turn requires a larger housing for the balloon and a much greater capacity for generating or supplying lighter than air gas to inflate the balloon. In summary, although the concept of a signal balloon has been known for several decades, there is still an unmet need for such a balloon that maintains its effectiveness regardless of wind conditions and that is sufficiently light and compact to be carried by an individual, such as a hiker, in relatively remote areas.

U.S. Pat. No. 3,002,490, granted Oct. 3, 1961, to M. F. Murray, discloses a survival kit which includes an inflatable brightly colored spherical balloon. A flag is attached to the tether below the balloon. Murray states that the round balloon has a tendency to drift downward below the tree tops on windy days and that, therefore, his balloon is constructed along the lines of a kite with a string attached to the center of the same so that it climbs if the wind is blowing. The manner in which the balloon and flag structure that is shown and described functions to produce this result is not clear.

U.S. Pat. No. 3,279,419, granted Oct. 18, 1966, to M. A. Demarco discloses several embodiments of a spherical signal balloon. One embodiment includes fin-like external ribs each of which extends along the surface of the balloon in a semicircular vertical arc. The ribs are described as causing the balloon to rotate in a horizontal wind. In another embodiment, the ribs are twisted rather than being in a straight vertical arc. These ribs are described as providing additional lift force to the balloon from horizontal winds which strike on the underside of the ribs.

U.S. Pat. No. 3,727,229, granted Apr. 10, 1973, to B. W. Clinger et al., discloses a spherical signal balloon having a conductive tether which is either a single wire conductor or a thinner wire twisted with nylon filament for strength. The conductive tether is connected to a radio freqency transmitter on the ground to provide radio frequency energy to the balloon to cause the balloon to luminesce. The tether may also act as an antenna for the transmitter. One embodiment of the balloon includes an upper hemisphere with a metallic coating and a lower hemisphere with a phosphor coating. In another embodiment, the western hemisphere is provided with a metallic coating. An additional embodiment of the balloon is shown in a folded condition and is described as being cylindrical and as being capable of being folded in a vertical column of predetermined length, width, and height.

U.S. Pat. Nos. 4,123,987, granted Nov. 7, 1978, to R. C. Singerle et al.; 4,185,582, granted Jan. 29, 1980, to C. C. Bryant; and 4,219,819, granted Aug. 26, 1980, to R. M. Patel, each disclose a system which includes an antenna for a radio transmitter. In the Patel and Bryant systems, the antenna is a metallic tether connected to a transmitter on the ground. In the Singerle et al. system, the transmitter is carried into the air by the balloon, and the antenna is a metallic material tail attached to the base of the balloon. Patel also discloses the simultaneous opening of the casing for the apparatus and the valve mechanism for inflating the balloon. A relector is hinged to the casing, and a switch that is activated by the reflector hinge activates the transmitter.

U.S. Pat. No. 4,114,561, granted Sept. 19, 1978, to V. F. Asaro, discloses a system in which an insertion needle extends through a lip on the balloon filler nozzle when the balloon is stowed. Following inflation of the balloon, the needle is withdrawn and the self-sealing lip closes to seal the inflation orifice. The mechanism is activated by pulling a lanyard which is attached to a cam lever. The pivoting of the cam lever moves a gas container end seal against a puncture needle.

A signal light carried by a balloon is disclosed in U.S. Pat. Nos. 2,619,303, granted Nov. 25, 1952, to H. M. Martin; 4,048,565, granted Sept. 13, 1977, to L. E. Rice, Sr.; 4,178,867, granted Dec. 18, 1979, to J. Y. Shyu; and 4,416,433, granted Nov. 22, 1983, to J. H. Bellina. In the Rice, Sr. and Bellina systems, an intermittent or strobe light is carried on the tether below the balloon. In the Martin and Shyu systems, the light is positioned inside a translucent or semitransparent balloon.

The patents discussed above and the prior art that is discussed and/or cited therein should be studied for the purpose of putting the present invention into proper perspective relative to the prior art.

DISCLOSURE OF THE INVENTION

The subject of the invention is improved signal devices. According to an aspect of the invention, an improvement is provided in a location signal device of the type having an inflatable signal balloon and means for deploying the balloon. The improvement comprises an inflatable balloon having, when inflated, a horizontally elongated configuration with opposite tapered ends. The balloon is shaped and dimensioned to cause the balloon to ascend in response to an increase in wind speed. According to another aspect of the invention, the balloon is provided in combination with a housing and has a deflated stowed position inside the housing. The combination also includes a tether having opposite ends attached to the housing and the balloon, respectively, and means carried by the housing for inflating the balloon and allowing it to ascend out of the housing.

A preferred feature of the signal device of the invention is lift surface means pivotably attached to the balloon. The lift surface means is connected to the tether to maintain a substantially horizontal position when the tether is substantially vertical and to pivot into a downwardly and rearwardly sloping position when the tether is inclined away from a vertical position. This provides increased lift when the tether is so inclined and causes the balloon to ascend. Preferably, the lift surface means comprises a lower member and an upper member. The lower member is pivotably attached to a lower surface of the balloon and connected to the tether. The upper member is pivotably attached to an upper surface of the balloon rearwardly of the lower member. The upper and lower members are connected to each other to pivot together in response to changes in orientation of the tether. In a preferred embodiment of the invention, a forward lift member is attached to the upper surface of the balloon forward of the upper member, and a rear lift member is attached to the lower surface of the balloon rearward of the lower member. The upper and lower surfaces extend substantially horizontally between the forward and upper members and the lower and rear members, respectively, and the balloon has a tapered rear end that terminates in a fin-shaped rudder.

The basic configuration of the balloon helps to ensure that the balloon maintains its attitude and thereby maintains its effectiveness in all types of terrain, including forested areas. The provision of lift surface means cooperates with the configuration of the balloon to help maintain the balloon altitude and thereby maximize the visibility and effectiveness of the balloon. The rudder of the preferred embodiment provides linear stabilization.

According to another aspect of the invention, the signal device comprises a housing and an inflatable balloon having a deflated stowed position inside the housing. The balloon includes sidewall portions capable of transmitting light. Light means is positioned inside the balloon to be visible through these sidewall portions. A fiber optic conductor is attached to the housing and the balloon to tether the balloon to the housing. The conductor has an end portion which forms part of the light means. A light source is positioned in the housing and is connected to the conductor for transmitting light from the source to the light means. The housing carries means for inflating the balloon and allowing it to ascend out of the housing.

The use of a fiber optic conductor as a tether makes it possible to provide the balloon with a light to increase its effectiveness as a signal, especially at night, while minimizing the weight that must be carried into the air by the balloon. With the weight to be carried minimized, the balloon can be made smaller. The smaller balloon requires less lighter than air gas to be fully inflated and ascend into its deployed position. The reduced requirement for inflation gas and the reduced size of the balloon help to reduce the overall size and weight of the device. This helps make the device practical for carrying by an individual who is hiking in the wilderness or engaging in similar activity. The use of a fiber optic conductor has the additional advantage of minimizing the number of metal components and of helping to insulate the user from lightning strikes.

In another preferred embodiment of the invention, the tether comprises an electric conductor, and the light means comprises an electric lamp connected to the conductor. An electric power source is positioned in the housing and is connected to the conductor for powering the lamp. This embodiment has the advantage of also having the capability of transmitting a radio frequency distress signal using the conductive tether as an antenna.

Another preferred feature of the invention is a balloon which has first and second opposite sidewalls each of which has a light transmitting portion and a reflective portion. The light transmitting portion of each sidewall is substantially opposite the reflective portion of the opposite sidewall. Light means is positioned between the sidewalls to be visible through the light transmitting portions. This preferred feature may be provided in any of the embodiments of the invention, regardless of the details of the light means and the balloon configuration and the material of the tether. This feature has the advantage of maximizing the visibility of the balloon and the effectiveness of a given light source. The light shines from the light means directly through the light transmitting portions. In addition, the light is reflected by the reflective portions through the light transmitting portions to increase the area of illumination and thereby increase the chances that the balloon will be detected as a signal device.

The device of the invention may also include additional features. One such feature is a housing that has a main portion and a cover portion in combination with a cam lever arrangement for inflating the balloon. In embodiments with this feature, the means for inflating the balloon includes a lever having a first end attached to the cover portion of the housing and a second end pivotably attached to the main portion. The device also includes puncture needle means for puncturing a sealed end of a gas cylinder, and a movable plate. A cam is carried by the second end of the lever and is positioned to engage the plate and move the plate toward the puncture needle means when the cover portion is pivoted away from the main portion of the housing. This arrangement has the advantages of being relatively simple in structure and yet highly reliable and easy to operate.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 3 is a side elevational view of the device shown in FIGS. 1 and 2 with the balloon in its stowed position.

FIG. 4 is like FIG. 3 except that it shows the opposite side of the device and the actuated position of the lever in phantom.

FIG. 5 is a front elevational view of the first preferred embodiment as shown in FIG. 3.

FIG. 6 is a side elevational view of the deployed balloon of the embodiment of FIGS. 1–5.

FIG. 10 is a pictorial view of the second preferred embodiment of the housing of the device.

FIG. 11 is a vertical sectional view of the device shown in FIG. 10, with the balloon in its stowed position.

FIG. 12 is a pictorial view of the apparatus shown in FIGS. 10 and 11, with the cover of the housing open and the balloon being inflated.

FIG. 13 is a fragmentary side elevational view of the cam lever mechanism shown in FIGS. 10–12, with the lever in its stowed position.

FIG. 14 is similar to FIG. 13 except that it shows the lever in its actuated position.

BEST MODES FOR CARRYING OUT THE INVENTION

Figure 1:
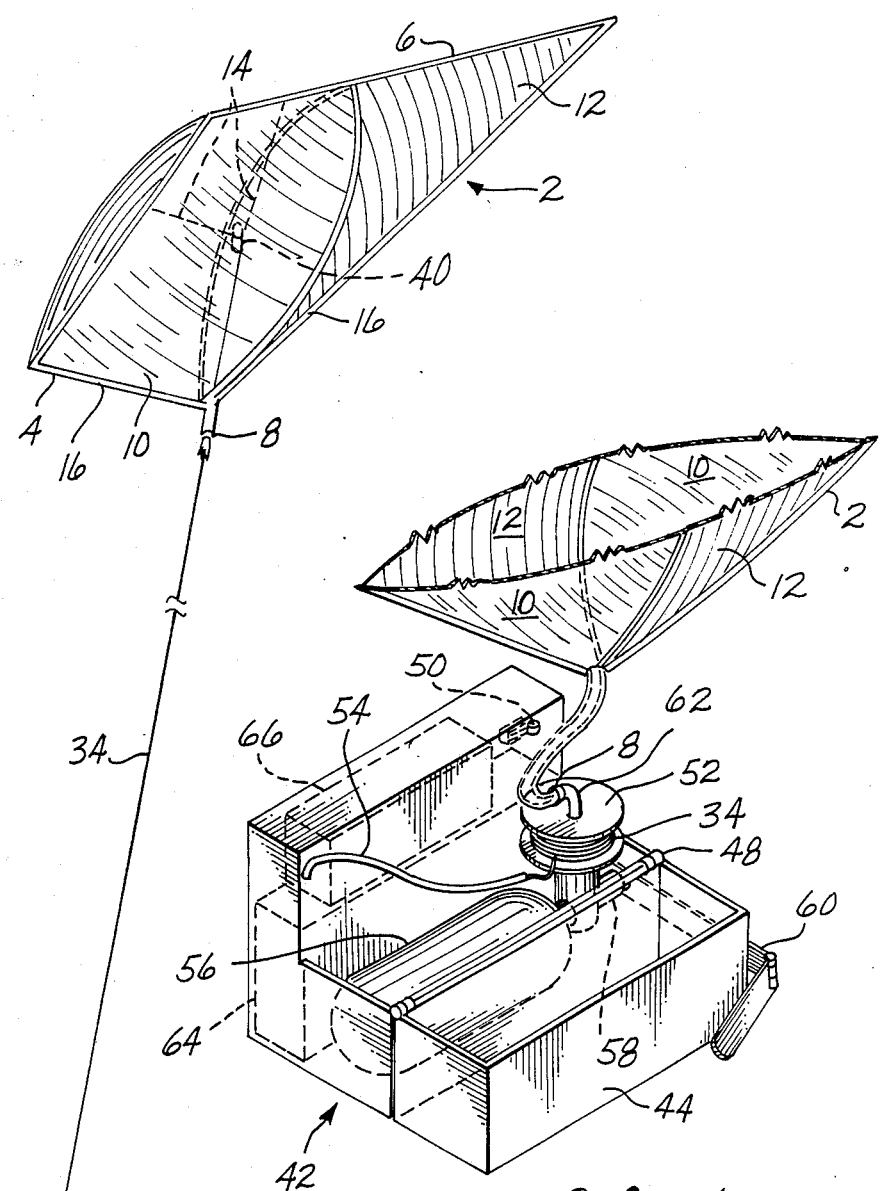
FIG. 1 is a pictorial view of a first preferred embodiment of the invention showing the balloon being inflated, with the top portion of the balloon cut away.
Figure 2:
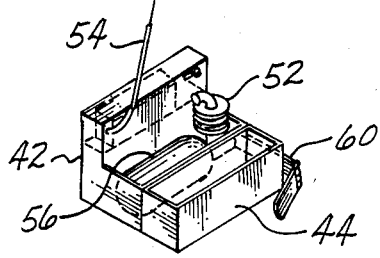
FIG. 2 is a pictorial view of the device shown in FIG. 1 with the balloon fully deployed.

The drawings show apparatus that is constructed according to the invention and that also constitutes the best modes of the invention currently known to the applicant. A first preferred embodiment of the invention is shown in FIGS. 1–7, and a second preferred embodiment is shown in FIGS. 8–14. The two embodiments shown in the drawings differ in both the balloon configuration and the details of the housing and deployment apparatus. It is intended to be understood that the balloon of FIGS. 1–7 could be provided in combination with the deployment apparatus of FIGS. 8–14 and that the balloon of FIGS. 8–14 could be provided in combination with the deployment apparatus of FIGS. 1–7. It is also intended to be understood that other modifications of the illustrated apparatus could be made without departing from the spirit and scope of the invention as set forth in the appended claims.

In each of the two preferred embodiments shown in the drawings, the apparatus includes a balloon 2, 2' which has a horizontally elongated configuration with a forward tapered end 4, 4' and a rear tapered end 6, 6'. The balloon 2, 2' is shaped and dimensioned to cause it to ascend in response to an increase in wind speed. The balloon 2, 2' has a self-sealing nipple 8, 8' and sidewall portions 10, 12, 10', 12' that are secured together along seams 16, 16'. Various materials may be used in forming the balloon 2, 2'. An example of a suitable material is the material sold under the trademark Mylar.

In each of the embodiments of the balloon 2, 2', light means 40, 40' is located inside the balloon 2, 2' and is held in position by monofilament light positioning lines 14, 14'. The outer ends of the lines 14, 14' are secured to the balloon 2, 2' by being incorporated into the seams 16, 16'. A tether 34, 34' has a lower end attached to the ground portion of the signal device and an upper end attached to the balloon 2, 2'. The tether 34, 34' extends into the interior of the balloon to the light means 40, 40' to provide power or light to the light means 40, 40'.

Figure 7:
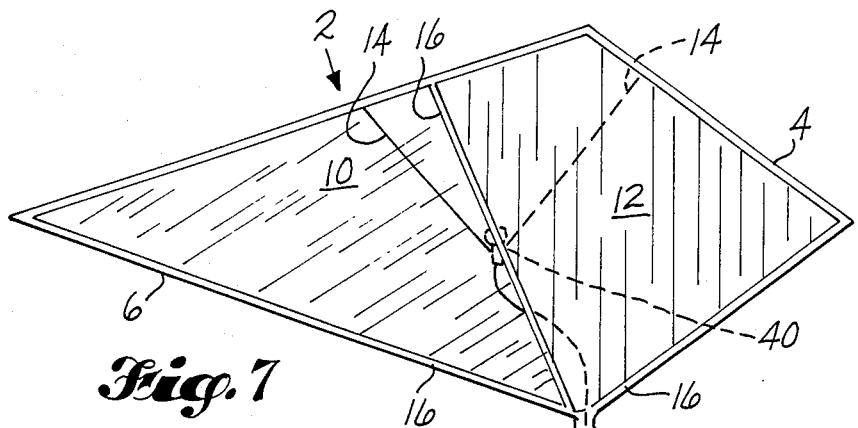
FIG. 7 is an elevational view of the opposite side of the balloon shown in FIG. 6.

In each of the preferred embodiments, the balloon 2, 2' includes opposite sidewalls each of which has a light transmitting portion 10, 10' and a reflective portion 12, 12'. The light transmitting portion 10, 10' of each sidewall is substantially opposite the reflective portion 12, 12' of the opposite sidewall. This feature is illustrated in FIGS. 6 and 7, which show the opposite sides of the first preferred embodiment of the balloon 2. This feature in the second preferred embodiment is most clearly seen in FIG. 9. In each of the two embodiments, the light transmitting and reflective portions 10, 10', 12, 12' are generally forward and rear portions of the sidewalls.

Figure 8:
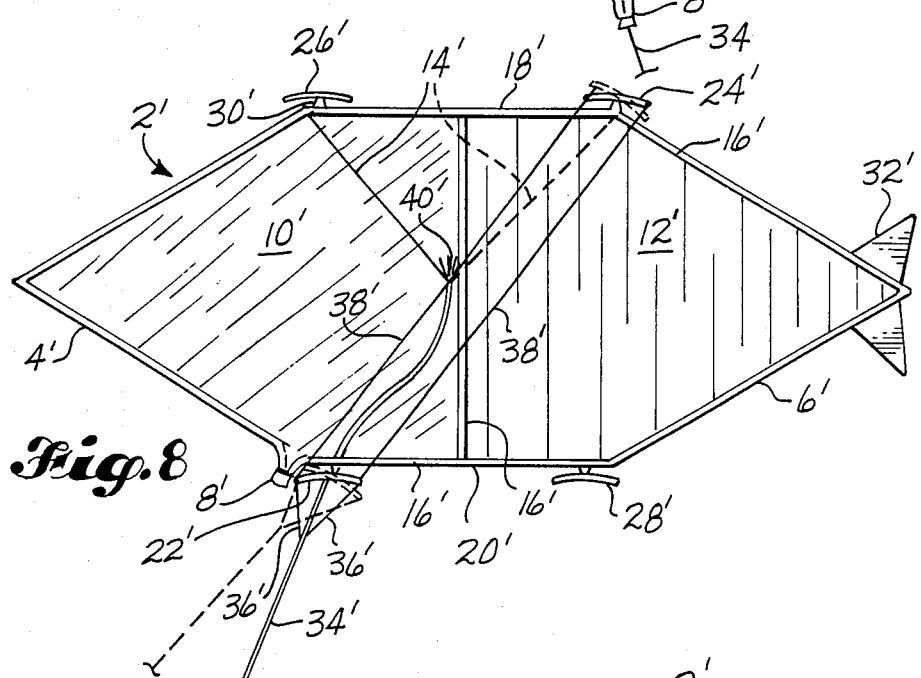
FIG. 8 is a side elevational view of a second preferred embodiment of the balloon.
Figure 9:
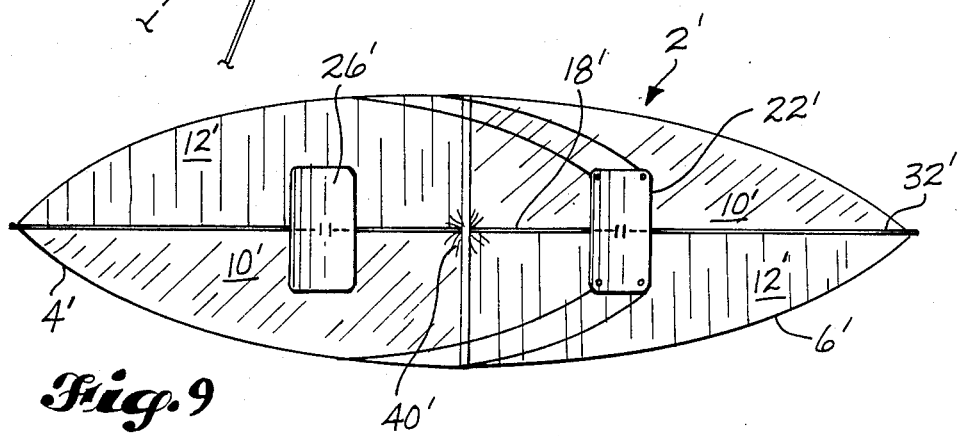
FIG. 9 is a top plan view of the balloon shown in FIG. 8.

The first preferred embodiment of the balloon 2 has the shape of a quadrilateral when viewed from the side, with a pointed forward end 4 and a pointed rear end 6 that is elongated relative to the forward end 4. The tether 34 is attached to the balloon 2 substantially at the bottom angle of the quadrilateral. Referring to FIGS. 8 and 9, the second preferred embodiment of the balloon 2' is generally fish-shaped with substantially symmetrical pointed forward and rear ends 4', 6'. The forward and rear ends 4', 6' extend from a central portion which has a substantially horizontal upper surface 18' and a substantially horizontal lower surface 20'. These upper and lower surfaces 18', 20' are formed by the upper seam 16' of the balloon 2', from which the sidewalls 10', 12' curve downwardly and outwardly, and the lower seam 16'. The tether 34' is attached to a forward portion of the lower surface 20'. A rudder 32' resembling the tail fin of a fish is provided at the tip of the rear end 6'. The rudder 32' is flat and may conveniently be formed as an extension of the seams 16'.

The balloon shown in FIGS. 8 and 9 is provided with a preferred feature of lift surface means pivotably attached to the balloon 2'. The lift surface means includes a lower member 22' that is pivotably attached to the forward portion of the lower surface 20', and an upper member 24' which is pivotably attached to the rear portion of the upper surface 18'. The tether 34' has branches 36' that are attached to the lower member 22'. Monofilament extension lines 38' extend between the lower and upper members 22', 24' to connect the members 22', 24' to each other so that they pivot together in response to changes in orientation of the tether 34'. The lines 36', 38' maintain the lower and upper members 22', 24' in a substantially horizontal position when the tether 34' is substantially vertical and the balloon 2' is at its maximum altitude. The connections cause the members 22', 24' to pivot into a downwardly and rearwardly sloping position when the tether 34' is inclined away from a vertical position. This is illustrated in broken lines in FIG. 8. The sloping position of the members 22', 24' provides the balloon 2' with increased lift when the tether 34' is inclined from a vertical position because of drifting of the balloon 2' in the wind. The increased lift in turn causes the balloon 2' to ascend to help maintain its maximum altitude and visibility.

The preferred embodiment of the balloon 2' shown in FIGS. 8 and 9 also has a forward lift member 26' secured to the upper surface 18' forward of the upper member 24' of the lift surface means, and a rear lift member 28' attached to the lower surface 20' rearward of the lower member 22'. The forward and rear members 26', 28' are substantially vertically aligned with the lower and upper members 22', 24', respectively. The upper and lower surfaces 18', 20' of the balloon 2' extend substantially horizontally between the forward and upper members 26', 24' and the lower and rear members 22', 28', respectively. Each of the members 22', 24', 26', 28' is slightly bowed, as shown in FIG. 8, and is attached to a balloon seam 16' by a triangular mount 30'. The members 22', 24', 26', 28' and the mounts 30' are preferably integral extensions of the seams 16'. The members 22', 24', 26', 28' are preferably stiffened such as by encasing a material like lacquered paper in the seam material.

The tether 34, 34' and the light means 40, 40' may be provided in various forms. In the embodiment shown in FIGS. 1-7, the tether 34 is an electric conductor. The conductor may take various suitable forms, such as a 32 gauge two conductor lacquered magnet wire. In this embodiment, the light means comprises a 6 volt high intensity halogen lamp. In the embodiment shown in FIGS. 8-14, the tether 34' is a silica grade fiber optic conductor. In this embodiment, the end of the conductor 40' is splayed to form the light means. Splayed end 40' sprays light onto the inner reflective surfaces of the reflective portions 12' of the balloon sidewalls. In each of the two embodiments, the tether 34, 34' is of a suitable length. It is anticipated that for most applications, a length of 125 feet will be suitable.

The ground apparatus shown in FIGS. 1-5 includes a housing 42 having a cover 44 pivotably attached to the main portion of the housing 42 by a spring loaded hinge 48. A friction latch 46 holds the cover 44 in the closed position shown in FIGS. 3-5. A gas cylinder 56 is secured in the housing 42 and is filled with a lighter than air gas, preferably helium, for inflating the balloon 2. The cylinder 56 is provided with a discharge valve 58 of a known type positioned between the cylinder 56 and a filler nozzle 62. An actuating lever 60 is positioned on the outside of the housing 42 and is pivotable to open communication between the cylinder 56 and the filler nozzle 62 through the valve 58. The outer end of the lever 60 is hinged to conform to the shape of the housing 42 prior to use of the signal device, as shown in FIG. 5.

When it is desired to deploy the signal balloon 2, the lever 60 is pivoted from the position shown in solid lines in FIG. 4 to the position shown in broken lines in FIG. 4. The pivoting of the lever 60 releases the latch 46 and allows the spring loaded hinge 48 to move the cover 44 into its open position shown in FIGS. 1 and 2. The pivoting of the lever 60 also opens the valve 58 to admit the gas into the balloon 2 through the filler nozzle 62 and the balloon nipple 8, which is positioned over the nozzle 62, as shown in FIGS. 1 and 5. As the balloon 2 inflates, it ascends out of the open top of the housing 42, as shown in FIG. 1. When the balloon 2 is fully inflated, the pressure of the gas from the cylinder 56 causes the nipple 8 to detach from the filler nozzle 62. The nipple 8 is self-sealing and closes the inflation orifice in the balloon 2 in a known manner when the nipple 8 moves away from the nozzle 62.

The tether 34 is wound around an easy play out reel 52 for deployment of the tether 34 and the balloon 2 ascends. The reel 52 functions in a manner similar to the reel on a fishing pole to play out the tether without causing twisting of the tether 34. In the preferred embodiment, the reel 52 is positioned around the nozzle 62 to maximize the efficient use of the space in the housing 42.

A battery 64 and a strobe circuit 66 are securely mounted in the housing 42 for powering the light 40. The lower end of the tether 34 is attached to the strobe circuit 66 which is in turn attached to the battery 64. A shock cord 54 is provided for preventing excessive stress on the tether connection to the circuit 66 when the balloon 2 reaches its fully deployed position. The shock cord 54 functions in a manner similar to a bungee.

A microswitch 50 is automatically triggered by the pivotal movement of the cover 44 away from the main portion of the housing 42. The switch 50 completes an electrical circuit to provide energy from the battery 64 through the strobe circuit 66 and tether 34 to the light 40. The battery 64 is of a suitable voltage to power the light 40 taking into consideration the voltage drop over the length of the tether 34. The strobe circuit 66 is of a conventional type. In the preferred embodiment, the circuit 66 energizes the light 40 for one half second every five seconds and is provided with a relay to connect the tether 34 with a radio transmitter (not shown) between light flashes. The tether 34 acts as an antenna for the transmitter.

The ground apparatus shown in FIGS. 10-14 includes a housing 42' with a cover 44'. The cover 44' is attached to the main portion of a housing 42' by means of two levers 83' on opposite sides of the housing 42'. Each lever 83' has a first end secured to the cover 44' and a second end pivotably attached to the main portion of the housing 42' by a pivot pin 82'. The pivoted end of each lever 83' is provided with a cam 84' for the purpose described below. The cover 44' may be provided with a handle or finger grip means (not shown) to aid in pivoting the cover 44' away from the main portion of the housing 42' about the pivot axis defined by the pins 82'. Preferably, the cover 44' frictionally engages the main portion of the housing 42', or is provided with a friction latch, to hold the cover 44' securely in the closed position shown in FIG. 10 when the signal device is being carried.

A battery 90', a strobe circuit 66', a xenon high intensity discharge lamp 92', and a light collector 94' are securely mounted in the housing 42'. The lower end of the tether 34' is attached to the light collector 94' to conduct light from the lamp 92' to the light means 40' formed by the upper end of the fiber optic tether 34'. A shock cord 54' is provided at the inner end of the tether 34'. In its stowed position, the tether 34' is wound around a reel 52' mounted on a filler nozzle 62' in the manner described above in connection with the embodiment of FIGS. 1-5.

As shown in FIGS. 11 and 12, the second preferred embodiment is provided with a plurality of small helium cylinders 56' rather than the single large cylinder 56 of the embodiment shown in FIGS. 1-5. The cylinders 56' are, for example, of the type used in children's toys with dimensions of about 3¾ inches by ¾ inch. In their stowed position, the cylinders 56' rest on a movable plate 74' that forms the bottom of a compressible compartment 72'. The plate 74' is slidable in an upward direction to move the cylinders 56' upwardly. The sidewalls 76' of the compartment 72' are made of a material that is sufficiently compressible to allow the movement of the plate 74'. The upper ends of the cylinders 56' are provided with penetrable seals and are moved against puncture needles 86' by movement of the plate 74'. A reinforcing bar 88' provides a rigid backing for the needles 86' to ensure penetration of the seals.

The plate 74' is provided with opposite lugs 80' that extend outwardly from the housing 42' through slots 78'. The lugs 80' are engaged by the cams 84' formed on the ends of the levers 83'. Pivotal movement of the cover 44' from the closed position shown in FIG. 10 to the open position shown in FIG. 12 moves the plate 74' by action of the cams 84'. FIGS. 13 and 14 illustrate the engagement of the lugs 80' by the cams 84'. The upward movement of the plate 74' moves the cylinders 56' upwardly so that the needles 86' penetrate the seals on the upper ends of the cylinders 56'. Penetration of the seals by the needles 86' allows gas to escape from the cylinders 56' into the compartment 72'. An outlet opening 87' in the sidewall 76' of the compartment 72' communicates with the filler nozzle 62'. Thus, penetration of the seals by the needles 86' automatically opens communication between the cylinders 56' and the interior of the balloon 2' to inflate the balloon 2'. Movement of the plate 74' also activates a microswitch 50' that is mounted on the strobe circuit casing 66', to activate the lamp 92' nd thereby provide light for the light means 40'.

As used herein, the term "horizontal" has been used to indicate the equilibrium orientation of the balloon 2, 2' shown in FIGS. 6–8. It is intended to be understood that the attitude of the balloon 2, 2' may deviate from this equilibrium position when the balloon 2, 2' is subjected to strong winds.

It should be obvious to those skilled in the art to which this invention is addressed that the invention may be used to advantage in a variety of situations and that various modifications and omissions in form and detail may be made without departing from the spirit and scope of the invention as defined in the following claims.

What is claimed is:

1. A signal device comprising:
a housing;
an inflatable balloon having a deflated stowed position inside the housing; said balloon, when inflated, having a horizontally elongated configuration with opposite tapered ends and being shaped and dimensioned to cause the balloon to ascend in response to an increase in wind speed; and said balloon having first and second laterally opposite sidewalls each of which has a light transmitting portion and a reflective portion, said light transmitting portion of each sidewall being substantially laterally opposite the reflective portion of the opposite sidewall;
light means positioned between sidewalls to be visible through said light transmitting portions; said reflective portions being positioned to reflect light from the light means through the light transmitting portions;
a tether having opposite ends attached to the housing and that balloon, respectively; and
means carried by the housing for inflating the balloon and allowing it to ascend out of the housing.

2. A device as recited in claim 1, in which the tether comprises an electric conductor, and the light means comprises an electric lamp connected to said conductor; and which further comprises an electric power source positioned in the housing and connected to said conductor for powering said lamp.

3. A device as recited in claim 1, further comprising lift surface means pivotably attached to the balloon; said lift surface means being connected to the tether to maintain a substantially horizontal position when the tether is substantially vertical and to pivot into a downwardly and rearwardly sloping position when the tether is inclined away from a vertical position, to provide increased lift when the tether is so inclined and cause the balloon to ascend.

4. A signal device comprising:
a housing;
an inflatable balloon having a deflated stowed position inside the housing; said balloon, when inflated, having a horizontally elongated configuration with opposite tapered ends and being shaped and dimensioned to cause the balloon to ascend in response to an increase in wind speed; and said balloon having first and second opposite sidewalls each of which has a light transmitting portion and a reflective portion, said light transmitting portion of each sidewall being substantially opposite the reflective portion of the opposite sidewall;
a tether having opposite ends attached to the housing and the balloon, respectively;
means carried by the housing for inflating the balloon and allowing it to ascend out of the housing; and
light means positioned between said sidewalls to be visible through said light transmitting portions;
said device comprising a fiber optic conductor having a main portion that forms the tether; said light means comprising an end portion of said conductor; and said device further comprising a light source positioned in the housing and connected to said conductor for transmitting light from said source to said light means.

5. A signal device comprising:
a housing;
an inflatable balloon having a deflated stowed position inside the housing; said balloon, when inflated, having a horizontally elongated configuration with opposite tapered ends and being shaped and dimensioned to cause the balloon to ascend in response to an increase in wind speed; and said balloon havingf sidewall portions capable of transmitting light;
a tether having opposite ends attached to the housing and the balloon, respectively;
means carried by the housing for inflating the balloon and allowing it to ascend out of the housing; and
light means positioned in an interior portion of the balloon to be visible through said sidewall portions;
said device comprising a fiber optic conductor having a main portion that forms the tether; said light means comprising an end portion of said conductor; and said device further comprising a light source positioned in the housing and connected to said conductor for transmitting light from said source to said light means.

6. A signal device comprising:
a housing;
an inflatable balloon having a deflated stowed position inside the housing; said balloon, when inflated, having a horizontally elongated configuration with opposite tapered ends and being shaped and dimensioned to cause the balloon to ascend in response to an increase in wind speed;
a tether having opposite ends attached to the housing and the balloon, respectively;
means carried by the housing for inflating the balloon and allowing it to ascend out of the housing; and
lift surface means pivotably attached to the balloon; said lift surface means being connected to the tether to maintain a substantially horizontal position when the tether is substantially vertical and to pivot into a downwardly and rearwardly sloping position when the tether is inclined away from a vertical position, to provide increased lift when the tether is so inclined and cause the balloon to ascend; and said lift surface means comprising a lower member pivotably attached to a lower surface of the balloon and connected to the tether, and an upper member pivotably attached to an upper surface of the balloon rearwardly of the lower member; said upper and lower members being connected to each other to pivot together in response to changes in orientation of the tether.

7. A device as recited in claim 6, which further comprises a forward lift member attached to said upper surface of the balloon forward of said upper member, and a rear lift member attached to said lower surface of the balloon rearward of said lower member; and in which said upper and lower surfaces extend substantially horizontally between said forward and upper members and said lower and rear members, respectively, and the balloon has a tapered rear end that terminates in a fin-shaped rudder.

8. A signal device comprising:
   a housing having a main portion and a cover portion;
   an inflatable balloon having a deflated stowed position inside the housing; said balloon, when inflated, having a horizontally elongated configuration with opposite tapered ends and being shaped and dimensioned to cause the balloon to ascend in response to an increase in wind speed;
   a tether having opposite ends attached to the housing and the balloon, respectively; and
   means carried by the housing for inflating the balloon and allowing it to ascend out of the housing; said means for inflating the balloon including a lever having a first end attached to said cover portion and a second end pivotably attached to said main portion, puncture needle means for puncturing a sealed end of a gas cylinder, a movable plate, and a cam carried out by said second end of the lever and positioned to engage the plate and move the plate toward the puncture needle means when said cover portion is pivoted away from said main portion.

9. An improved location signal device of the type having an inflatable signal balloon and means for deploying the balloon, wherein the improvement comprises:
   an inflatable balloon having, when inflated, a horizontally elongated configuration with opposite tapered ends; said balloon being shaped and dimensioned to cause the balloon to ascend in response to an increase in wind speed; and said balloon having first and second laterally opposite sidewalls each of which has a light transmitting portion and a reflective portion, said light transmitting portion of each sidewall being substantially laterally opposite the reflective portion of the opposite sidewall; and
   light means positioned between said sidewalls to be visible through said light transmitting portions; said reflective portions being positioned to reflect light from the light means through the light transmitting portions.

10. A device as recited in claim 9, further comprising a tether attached to the balloon for securing the balloon to an object on the ground, and lift surface means pivotably attached to the balloon; said lift surface means being connected to the tether to maintain a substantially horizontal position when the tether is substantially vertical and to pivot into a downwardly and rearwardly sloping position when the tether is inclined away from a vertical position, to provide increased lift when the tether is so inclined and cause the balloon to ascend.

11. An improved location signal device of the type having an inflatable signal balloon and means for deploying the balloon, wherein the improvement comprises:
   an inflatable balloon having, when inflated, a horizontally elongated configuration with opposite tapered ends; said balloon being shaped and dimensioned to cause the balloon to ascend in response to an increase in wind speed;
   a tether attached to the balloon for securing the balloon to an object on the ground; and
   lift surface means pivotably attached to the balloon; said lift surface means being connected to the tether to maintain a substantially horizontal position when the tether is substantially vertical and to pivot into a downwardly and rearwardly sloping position when the tether is inclined away from a vertical position, to provide increased lift when the tether is so inclined and cause the balloon to ascend; and said lift surface means comprising a lower member pivotably attached to a lower surface of the balloon and connected to the tether, and an upper member pivotably attached to an upper surface of the balloon rearwardly of the lower member; said upper and lower members being connected to each other to pivot together in response to changes in orientation of the tether.

12. A device as recited in claim 11, which further comprises a forward lift member attached to said upper surface of the balloon forward of said upper member, and a rear lift member attached to said lower surface of the balloon rearward of said lower member; and in which said upper and lower surfaces extend substantially horizontally between said forward and upper members and said lower and rear members, respectively, and the balloon has a tapered rear end that terminates in a fin-shaped rudder.

13. A signal device comprising:
   a housing;
   an inflatable balloon having a deflated stowed position inside the housing, and including sidewall portions capable of transmitting light;
   light means positioned inside the balloon to be visible through said sidewall portions;
   a fiber optic conductor attached to the housing and the balloon to tether the balloon to the housing; said conductor having an end portion which forms part of said light means;
   a light source positioned in the housing and connected to said conductor for transmitting light form said source to said light means; and
   means carried by the housing for inflating the balloon and allowing it to ascend out of the housing.

14. A device as recited in claim 13, in which the balloon has first and second opposite sidewalls each of which has a light transmitting portion and a reflective portion, said light transmitting portion of each sidewall being substantially opposite the reflective portion of the opposite sidewall; and in which said light means is positioned to be visible through said light transmitting portions.

* * * * *

UNITED STATES PATENT AND TRADEMARK OFFICE
CERTIFICATE OF CORRECTION

PATENT NO. : 4,787,575
DATED : November 29, 1988
INVENTOR(S) : Ronald R. Stewart It is certified that error appears in the above-identified patent and that said Letters Patent is hereby corrected as shown below:

Column 3, line 39, "attitude" should be -- altitude --.
Column 9, line 12, "nd" should be -- and --.
Claim 1, column 9, line 41, after "between", insert -- said --; and in line 47, "that" should be -- the --.
Claim 8, colunn 11, line 33, delete "out".
Claim 13, column 12, line 53, "form" should be -- from --.

Signed and Sealed this

Twenty-eighth Day of September, 1993

Attest:

Attesting Officer

BRUCE LEHMAN

Commissioner of Patents and Trademarks